United States Patent
McTaggart

(10) Patent No.: US 6,578,407 B1
(45) Date of Patent: Jun. 17, 2003

(54) SYSTEM FOR LEAK TESTING INDUSTRIAL COMPONENTS

(75) Inventor: Michael Douglas McTaggart, Windsor (CA)

(73) Assignee: Valiant Corporation, Windsor (CA)

( * ) Notice: Subject to any disclaimer, the term of this patent is extended or adjusted under 35 U.S.C. 154(b) by 0 days.

(21) Appl. No.: 10/056,670

(22) Filed: Jan. 25, 2002

(51) Int. Cl.$^7$ .................................................. G01M 3/04
(52) U.S. Cl. ................................ 73/40; 73/41; 73/49.7
(58) Field of Search ............................ 73/40, 40.7, 41, 73/45, 45.1, 45.2, 49.7

(56) References Cited

U.S. PATENT DOCUMENTS

| | | | | |
|---|---|---|---|---|
| 3,930,400 A | * | 1/1976 | Plegat ......................... | 73/45.2 |
| 4,671,101 A | * | 6/1987 | Franklin ...................... | 73/49.3 |
| 4,719,801 A | * | 1/1988 | Blaser et al. ................. | 73/592 |
| 4,771,630 A | * | 9/1988 | Croce et al. ................. | 73/49.3 |
| 5,010,761 A | * | 4/1991 | Cohen et al. ................ | 73/40.7 |
| 5,213,816 A | * | 5/1993 | Smyth, Jr. et al. ........... | 425/78 |
| 5,614,661 A | * | 3/1997 | Balordi ....................... | 73/49.3 |
| 5,618,990 A | * | 4/1997 | Iwao et al. ................... | 73/40 |
| 6,330,822 B1 | * | 12/2001 | Hawk et al. ................. | 73/40.7 |

* cited by examiner

Primary Examiner—Helen Kwok
Assistant Examiner—Charles Garber
(74) Attorney, Agent, or Firm—Gifford, Krass, Groh, Sprinkle, Anderson & Citkowski, P.C.

(57) ABSTRACT

A system for leak testing industrial components, such as engine blocks, is disclosed and includes a conveyor system for transporting the engine components to and from a test area having a support surface. A robot is operable in the test area and includes a manipulator which engages and moves the industrial components. At least two leak test units are provided where each leak test unit includes a shuttle for receiving the industrial component from the robot and thereafter subjecting that industrial component to a leak test. Each leak test unit then generates a failure output signal in response to a failed leak test on the industrial component. Each leak test unit is movably mounted to the test area support surface between an operable position and an inoperable position. In its operable position the leak test unit is positioned in the test area to receive the industrial components from the robot and perform the leak test. Conversely, in its retracted position, the leak test unit is positioned outside of the test area for maintenance, repair or the like. A robot control circuit controls the movement of the industrial components by the robot between the conveyor system and one or more of the selected leak test units in response to at least one control factor, such as a failure output from one of the leak test units.

16 Claims, 5 Drawing Sheets

SYSTEM FOR LEAK TESTING INDUSTRIAL COMPONENTS

BACKGROUND OF THE INVENTION

I. Field of the Invention

The present invention relates to a system for leak testing industrial components, such as engine blocks.

II. Description of the Prior Art

In the manufacture of industrial products, such as automotive engines, it is oftentimes necessary to subject the various industrial components, such as engine blocks and cylinder heads, to leak testing to ensure that the industrial component will perform properly when assembled into its final configuration. Such leak testing of the industrial component prior to its assembly in the final product avoids incorporating defective industrial components in the final product and the cost associated with such defective products.

There have been previously known leak testing systems used for industrial components, such as engine blocks and cylinder heads (typical), prior to the assembly of the other engine components onto the engine block. These previously known leak testing systems typically comprise a conveyor which conveys the engine blocks to a leak testing unit which performs the required leak test by sealing the passages of the engine block and applying an internal pressure to the now sealed passageways. An engine block which maintains a determined calibrated pressure within its interior for a predetermined period of time, e.g. thirty seconds, would pass the leak test and would then be returned to the conveyor line which conveys the engine block to a subsequent assembly or processing station downstream from the leak testing system.

Conversely, if the engine block does not maintain the desired pressure within the interior of the engine block after a predetermined time period, the engine block is marked as defective and is conveyed by a separate conveyor line from the leak testing system for further processing in an attempt to correct the leakage problem, or for scrappage.

These previously known leak testing systems, however, have suffered a number of disadvantages. One disadvantage of these previously known leak testing systems is that such systems utilize resilient seals which compress against the engine block during the leak test in order to enable pressurization of the internal passages of the engine block. The repeated compression and decompression of the seals against sequential engine blocks, however, cause the seals to rapidly degrade so that the seals must be routinely replaced on a fairly frequent basis, i.e. weekly. Maintenance to the leak testing units to replace the seals, however, requires that the entire conveyor line be shut down during maintenance on the leak testing system. This, in turn, results in stoppage of the entire assembly process for the assembly line.

A still further disadvantage of these previously known leak testing systems is that, in the event that the seals on the leak testing system become worn or damaged, pressure leaks can occur through or around the damaged seal. When this occurs, the leak testing system generates a failure signal indicative that the engine block has failed the leak test when, in fact, the engine block is not defective. However, since the leak testing system has generated a defective engine block signal, the engine block is disadvantageously treated as defective and conveyed by the conveyor system to a defective engine block storage area.

In the prior practice, deterioration or failure of the seals at the leak testing unit was sometimes detected by the occurrence of a number of sequential engine blocks, all of which failed the leak test. In this event, the seals on the leak testing unit were then replaced and the rejected engine blocks retested by the leak testing system. This procedure, however, was both time consuming and labor intensive.

SUMMARY OF THE PRESENT INVENTION

The present invention provides a leak testing system which overcomes all of the above-mentioned disadvantages of the previously known systems.

In brief, the system of the present invention comprises a conveyor system for transporting industrial components, such as engine blocks, to and from a test area having a support surface. A robot is mounted and operable within the test area and this robot includes a manipulator which engages and moves the industrial components.

At least two leak test units, each having means for receiving the industrial component from the robot, are provided wherein each leak test unit includes means for subjecting the industrial component to a leak test after receiving the industrial component from the robot. Each leak test unit generates a failure output signal in response to a failed leak test on the industrial component as well as a pass output signal when the industrial components pass the leak test.

Each leak test unit is movably mounted to the test area support surface so that each leak test unit is movable between an operable position and an inoperable position. In its operable position, the leak test unit is positioned in the test area and is adapted to receive the industrial components from the robot. Conversely, in its inoperable position, the leak test unit is positioned outside of the test area for repair, seal replacement, maintenance and/or the like.

A robot control means controls the movement of the industrial components by the robot between the conveyor system and one or more selected leak test units in response to at least one control factor, such as a failure or pass output signal from one of the leak test units. As will be hereinafter described in greater detail and by way of example only, in the event that an industrial component fails the leak test on one leak test unit, the robot control means then controls the operation of the robot to move the failed industrial component from one leak test unit and to a second leak test unit. A failure of the same industrial component at the second leak test unit would be indicative that the industrial component is, in fact, defective. In this event, the robot control means controls the operation of the robot to move the defective industrial component to the conveyor system to convey the defective industrial component to the appropriate area for reworking, scrappage or the like.

Conversely, a failure of the leak test by the industrial component at one leak test unit followed by a passed leak test at a subsequent leak test unit would be indicative that the first leak test unit requires maintenance, such as seal replacement. In that event, the first leak test unit is moved to its retracted position and thus outside the test area. Simultaneously, the robot control means receives an input signal that the first leak test unit is no longer in operation in the test area. In this event, the robot control means controls the operation of the robot to move the industrial components between the conveyor system and any remaining leak test units that are in their operable position. Consequently, continued operation of the conveyor line may occur without interruption even during maintenance on the individual leak test units, albeit at a reduced capacity.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
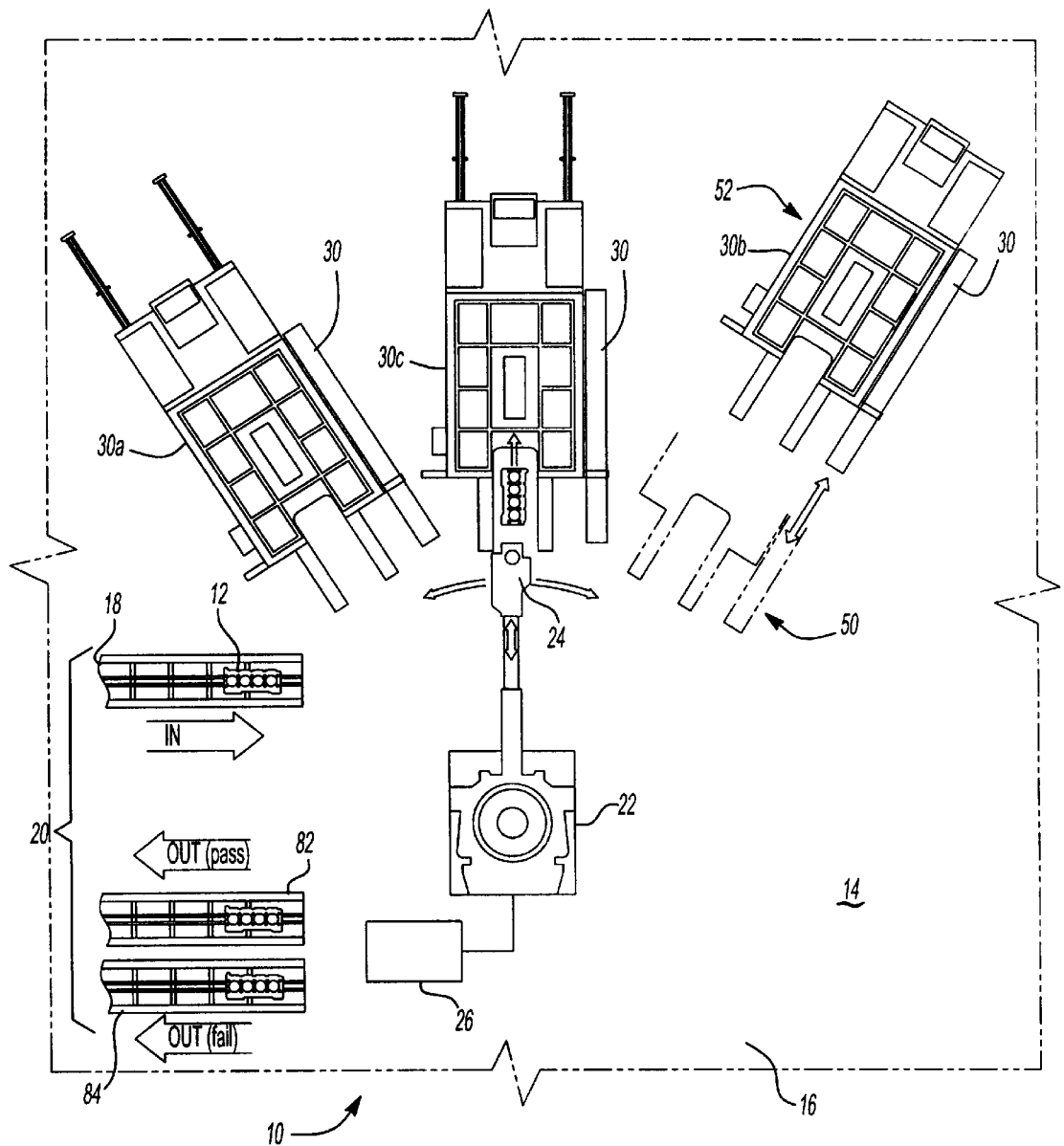
FIG. 1 is a top plan view illustrating a preferred embodiment of the present invention.

With reference first to FIG. 1, a top plan view of the leak test system 10 of the present invention is there shown for leak testing industrial components 12, such as engine blocks. The industrial components 12 are conveyed to a test area 14 having a support surface 16 by a conveyor line 18 of a conveyor system 20. The conveyor line 18 of the conveyor system 20 may be of any conventional construction and is illustrated merely diagrammatically in FIG. 1.

Still referring to FIG. 1, a robot 22 is mounted within the test area 14. The robot 22 may be of any conventional construction and includes a robot manipulator 24 which engages and moves the industrial parts 12. A robot control means 26 controls the actual operation of the robot 22 and thus the movement of the industrial components 12 by the robot manipulator 24. The robot control means 26 is programmable and preferably microprocessor based.

Figure 2:
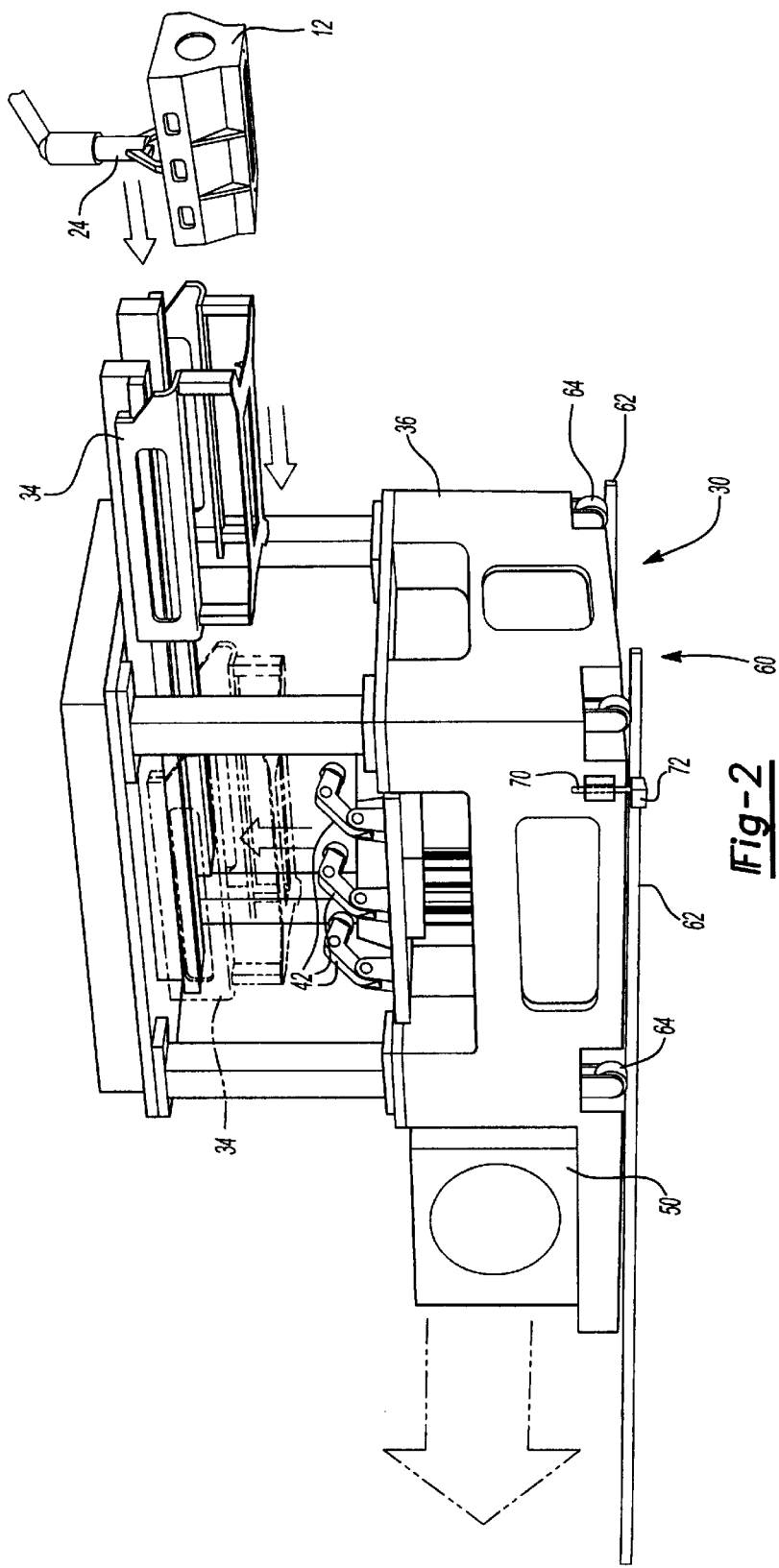
FIG. 2 is a perspective view illustrating one leak test unit.

With reference now to FIGS. 1 and 2, the leak testing system 10 includes at least two leak test units 30. Each leak test unit 30 is self-contained, i.e., has its own circuitry and power means, and operates independently of the other leak test units 30. Furthermore, each leak test unit is designed to perform a leak test on the industrial component 12.

With reference now particularly to FIG. 2, one leak test unit 30 is there shown in greater detail and includes a shuttle 34 movable between an extended position, illustrated in solid line, and a retracted position, illustrated in phantom line. In its extended position, the shuttle 34 is positioned to receive the industrial component 12 from the robot manipulator 24. Conversely, in its retracted position, the shuttle 34, together with its contained industrial component 12, is positioned within a housing 36 of the leak test unit 30.

Figure 3:
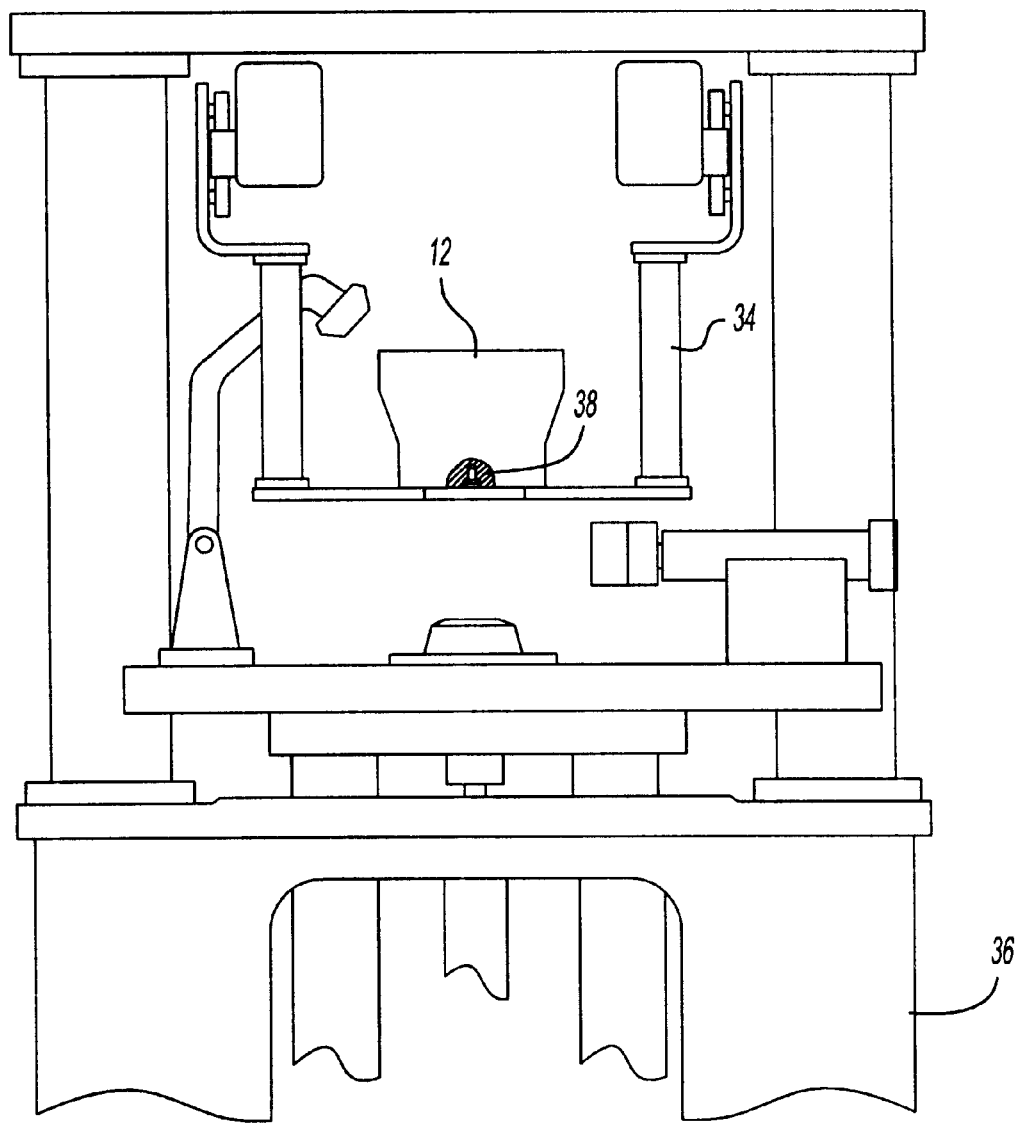
FIGS. 3–5 are all front diagrammatic views illustrating the operation of a single leak test unit.
Figure 4:
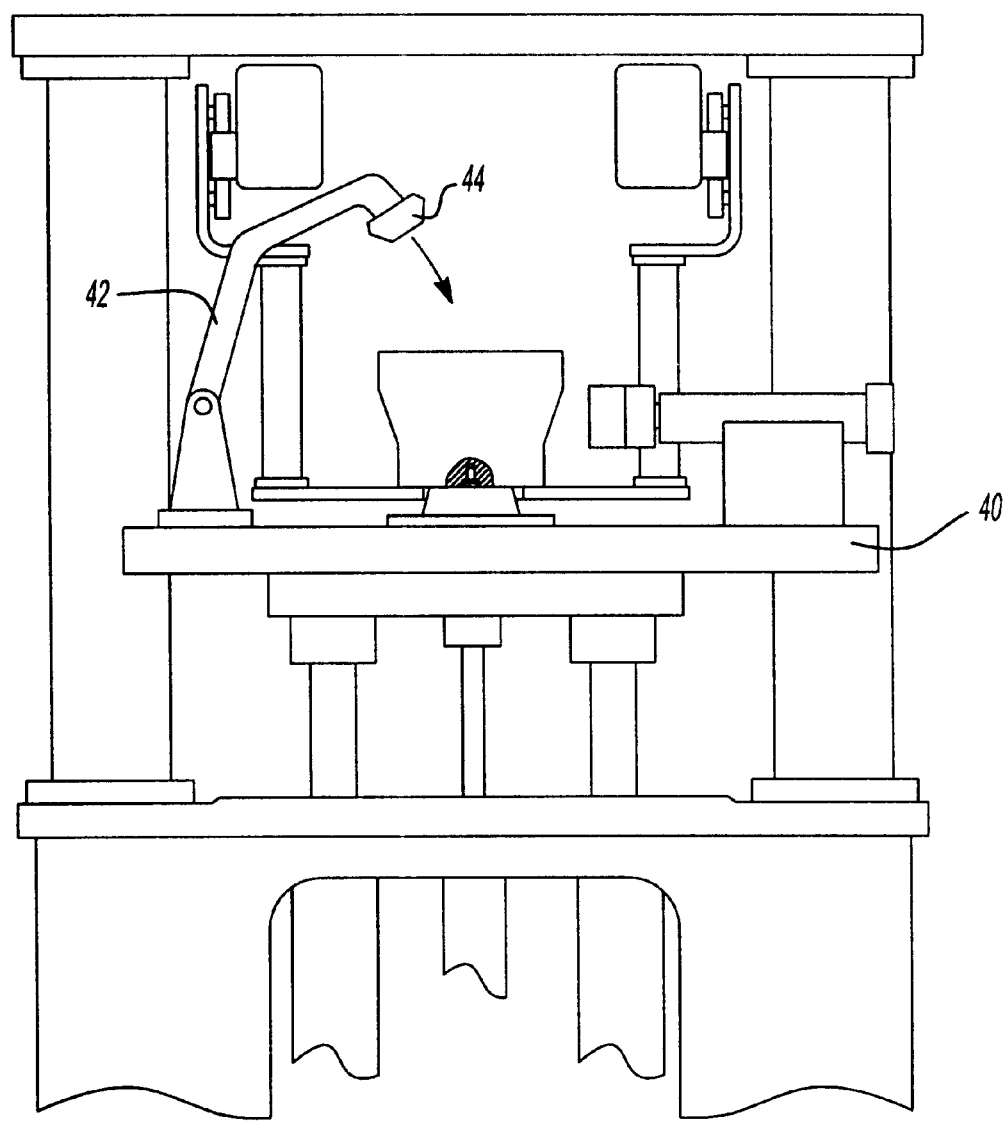
Figure 5:
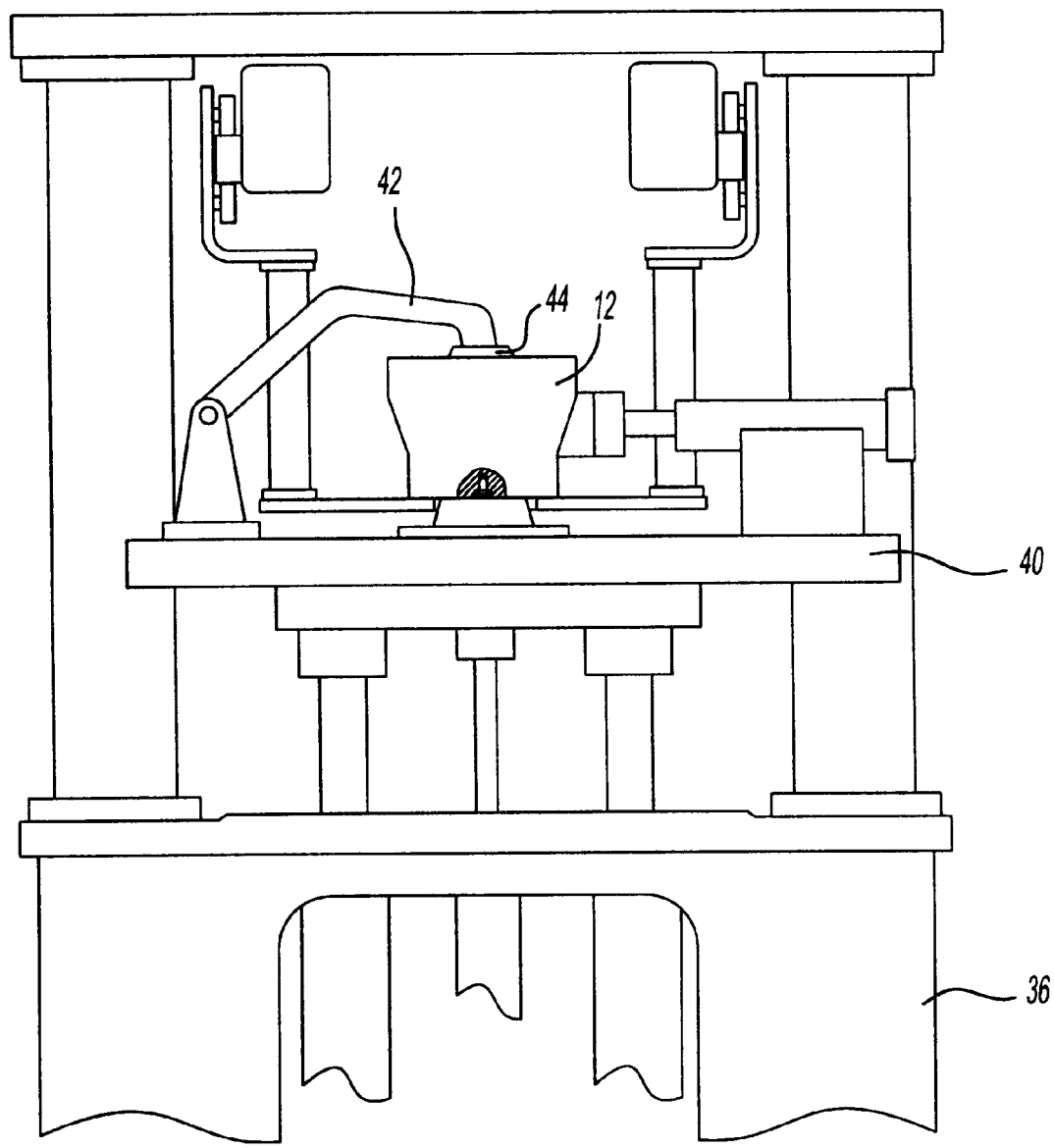

With reference now to FIGS. 3–5, a single leak test on the industrial component 12 is there shown diagrammatically for the purposes of completeness. In FIG. 3, the shuttle 34 has moved the industrial component 12 into the interior of the leak test unit housing 36. Furthermore, the shuttle 34 includes conventional locating pins 38 which engage receiving surfaces on the industrial components 12 so that the industrial component 12 is precisely positioned relative to the shuttle 34.

With reference now to FIGS. 4 and 5, after the shuttle 34 has moved to its retracted position, a platen 40 containing a plurality of leak testing arms 42 having seals 44 (only one shown for the sake of simplicity) is moved to its upper position. The arms 42 with their seals 44 are then moved by conventional actuators to the position shown in FIG. 5 in which the seals 44 sealingly engage the industrial components 12 and thereafter the leak test unit 30 pressurizes the internal passages of the industrial component 12. It will be appreciated, of course, that the various testing arms 42 and their seals 44 must be specially designed for different industrial components 12.

With reference now particularly to FIG. 2, each leak test unit 30 includes a control circuit 50, illustrated only diagrammatically, which through conventional sensors measures the internal pressure of the industrial part 12 a predetermined time period following pressurization of the industrial part 12. In the event that the internal pressure of the industrial part is below a predetermined threshold when measured by the control circuit 50, the control circuit 50 generates a failure output signal indicative that the industrial part 12 has failed the leak test. Conversely, if the pressure remains above the predetermined threshold after the preset time period, the control circuit generates a passed output signal. This failed or passed output signal is coupled as an input signal to the robotic control means 26 (FIG. 1).

With reference now to FIGS. 1 and 2, each leak test unit 30 is movable between an operable position, illustrated in FIG. 2 and in phantom line at 50 in FIG. 1, and an inoperable position, illustrated at 52 in FIG. 1. In its operable position, the leak test unit is positioned in the test area 14 and at a position ready to receive the industrial components 12 from the robot 22. Conversely, with the leak test unit 30 in its inoperable position, the leak test unit 30 is moved outside of the test area 14 for maintenance, repair or the like despite continued operation of the robot 22. When in its inoperable position, the leak test unit control circuit 50 generates an output signal to the robot control means 26 that the leak test unit 30 is unavailable to receive industrial components 12 from the robot 22.

Any conventional means may be utilized to move the leak test units 30 between their operable positions and their inoperable positions. However, in the preferred embodiment of the invention, a track assembly 60 having a pair of spaced apart and parallel tracks 62 is secured to the support surface 16 in the test area 14 so that the tracks extend generally radially with respect to the robot 22. Each test unit 30 includes a plurality of wheels 64 mounted to the housing 36 which cooperate with the tracks 62 so that the leak test unit 30 may be rolled on the tracks 62 between its operable and its inoperable positions.

In order to ensure that each leak test unit is accurately positioned at its operable position for proper coordination between the leak test unit 30 and the robot 22, as best shown in FIG. 2, a lock pin 70 is vertically slidably mounted to the housing 36 for the leak test unit 30. This lock pin 70 cooperates with a pin receptacle 72 mounted to the support surface 16 in the test area 14. Consequently, when the lock pin 70 is properly seated within the receptacle 72, the lock pin 70 not only accurately positions its associated leak test unit 30 relative to the test area 14, but also prevents movement of its associated leak test unit 30 along the tracks 62.

With reference again to FIG. 1, the robot control means 26 controls the actuation of the robot 22 to move the industrial components 12 not only between the conveyor system 20 and the individual leak test units 30 but, in a fashion to be described hereinafter in greater detail, between the leak test units 30 themselves. Furthermore, the conveyor system 20 includes not only the first line 12, but also two output lines 80 and 82. The output line 82 is used to convey industrial components 12 which have passed the leak test out of the test area 14 while, conversely, the conveyor line 82 conveys the industrial components 12 that have failed the leak test out of the test area 14. The conveyor lines 82 and 84 may be of any conventional construction and are illustrated only diagrammatically in FIG. 1. Alternatively, a single output conveyor line may be used while a control mechanism (not shown) keeps track of which industrial components on the output conveyor line have passed the leak test and which have failed.

With reference now to FIG. 1, the operation of the leak testing system of the present invention will now be described assuming that all three leak test units 30 are designed to test the same industrial component. In order to differentiate between the leak test units 30, they will be hereinafter referred to as units 30a, 30b and 30c.

Assuming first that all three leak test units 30a, 30b and 30c are in their operable position, the robot 22 first retrieves an industrial component 12 from the conveyor line 18 and places the industrial component in the shuttle 34 associated with the first test unit 30a. Since a complete leak test may extend for a relatively long period of time, e.g. thirty seconds, the robotic control means 26 actuates the robot 22 to sequentially load industrial components from the incoming conveyor line 18 to the second leak test unit 30b and third leak test unit 30c.

Assuming that the industrial component 12 in the first leak test unit 30a passes the leak test, the robotic control means 26 actuates the robot 22 to remove the industrial component from the first leak test unit 30a and place that industrial component on the conveyor output line 82. Furthermore, in order to ensure proper coordination between the robot 22 and the individual leak test units 30a, 30b and 30c, each leak test unit 30a, 30b and 30c provides output signals to the robot control means 26 indicative of the position of the shuttle 34 associated with each leak test unit to ensure proper placement and removal of the industrial components 12 into the leak test unit shuttles 34.

The robot control means 26 then controls the actuation of the robot 22 to reload the now empty leak test unit 30a with a new industrial component 12, remove the industrial component from the second leak test unit 30 (assuming that the industrial component 12 in the second leak test unit 30b has also passed the leak test), reload the leak test unit 30b and likewise for the third leak test unit 30c.

In the event that the industrial component 12 fails the leak test in any of the leak test units 30, such as the leak test unit 30b, that failure is communicated by the control circuit 50 for the leak test unit 30b to the robot control means 26 as a "failure" signal. At that time, it is unknown whether the failure of the leak test by the leak test unit 30b resulted from a defective industrial component 12, or from defective sealing by the leak test unit 30b. Consequently, in the event of failure at any leak test unit, such as leak test unit 30b, the robot control means 26 then moves the industrial component from the leak test unit 30b to one of the other leak test units 30a or 30c where the leak test on that particular industrial component 12 is repeated.

In the event that the industrial component fails the second leak test at the second leak test unit 30, in all likelihood, the industrial component is defective. In that event, the robot control means 26 removes the defective industrial component from the leak test unit performing the second test, i.e. the leak test unit 30a for this example, and places the defective industrial component on the conveyor line 84 where the industrial component is moved to an area for processing defective parts.

Conversely, if the industrial component failed the leak test at the leak test unit 30b and yet passes the leak test during the second test by the leak test unit 30a, such a result is indicative that the seals on the leak test unit 30b require replacement or that other maintenance on the leak test unit 30b is required. In that event, the leak test unit 30b is moved to its inoperable position illustrated at 52 in FIG. 1 so that the leak test unit 30b is effectively removed from the leak testing system 10. The repositioning of the leak test unit 30b also sends a position signal as a control factor to the robot control means 26 that the leak test unit 30b is no longer capable of accepting industrial components to perform leak tests so that the control means 26 ceases any attempts to load or unload industrial components from the inoperative leak test unit 30b.

After the leak test unit 30b is moved to its inoperable position, continued operation of the leak testing system 10 can continue by utilizing the other two leak test units 30a and 30c, albeit at a reduced capacity. During this time, any required maintenance on the leak test unit 30b may be performed and, when completed, the leak test unit 30b is returned to its operable position and the operation of the complete system utilizing all three leak test units 30a, 30b and 30c resumes.

Although servicing of the leak test unit 30 may be performed only upon failure of the leak test unit in the fashion described above, alternatively, the leak test units 30 may be moved to their inoperable position at preset time periods for scheduled maintenance.

It will, of course, be understood that the leak testing system 10 of the present invention shown in FIG. 1 as having three leak test units 30 is by way of example only and that the system 10 may contain two or more leak test units 30. Furthermore, the leak test system 10 may be utilized to perform leak tests on different types of industrial components by simply using different leak test units 30, each designed to accommodate a specific industrial component, with the system 10.

From the foregoing, it can be seen that the present invention provides a leak testing system for industrial components, such as engine blocks and cylinder heads, which is simple and yet highly effective in operation.

Having described my invention, however, many modifications thereto will become apparent to those skilled in the art to which it pertains without deviation from the spirit of the invention as defined by the scope of the appended claims.

I claim:

1. A system for leak testing industrial components comprising:

a conveyor system for transporting the industrial components to and from a test area having a support surface, a robot operable in said test area, said robot having a manipulator which engages and moves the industrial components, at least two leak test units, each leak test unit having means for receiving the industrial component from said robot, means at said leak unit for thereafter subjecting said industrial component to a leak test, each leak test unit generating a failure output signal in response to a failed leak test on the industrial component, means for movably mounting each of said leak test units to said test area support surface between an operable position in which each said leak test unit is positioned in said test area to receive the industrial components from said robot, and an inoperable position in which the leak test unit is positioned outside of said test area, a robot control means for controlling the movement of the industrial components by said robot between said conveyor system and one or more selected leak test units in response to at least one control factor, said at least one control factor including said failure output signal wherein said robot control means controls the movement of the robot to transfer the industrial component from one leak test unit to another leak test unit in response to a failure output signal received by said robot control means from said one leak test unit following a leak test on the industrial component.

2. The invention as defined in claim 1 wherein said at least one control factor comprises the position of each leak test unit and means for transmitting the position of each leak test unit as an input signal to said robot control means.

3. The invention as defined in claim 1 wherein said mounting means comprises an elongated track assembly associated with each leak test unit and mounted to said test area support surface, and a track follower mounted to leak test unit, each said track follower cooperating with its associated track assembly to enable movement of each said leak test unit along said track assembly.

4. The invention as defined in claim 1 and comprising means for selectively locking each of said leak test units in their respective operable positions.

5. The invention as defined in claim 4 wherein each said locking means comprises a pin vertically slidably mounted to each said leak test unit and movable between an upper unlocked position and a lower locked position, a pin retainer secured to said test area support surface at a preset position with respect to each track assembly, said pin cooperating with said pin retainer when said pin is in said locked position to preclude movement of each said leak test unit relative to its associated track assembly.

6. The invention as defined in claim 1 wherein said convey system comprises a first conveyor line for transporting industrial components to be tested to said test area, a second conveyor line for transporting industrial components that have passed the leak test performed by one or more leak test units from said test area and a third conveyor line for transporting industrial components that have failed the leak test performed by one or more leak test units from said test area.

7. The invention as defined in claim 1 wherein said at least one control factor further comprises the type of the industrial component, and means for providing an input signal to said robot control means indicative of the type of industrial component.

8. The invention as defined in claim 1 wherein said robot control means comprises a microprocessor based control circuit.

9. The invention as defined in claim 1 wherein each leak test unit is independently operable and independently powered with respect to the other leak test unit(s).

10. A system for leak testing industrial components comprising:
 a conveyor system for transporting the industrial components to and from a test area having a support surface,
 a robot operable in said test area, said robot having a manipulator which engages and moves the industrial components,
 at least two leak test units, each leak test unit having means for receiving the industrial component from said robot, means at said leak unit for thereafter subjecting said industrial component to a leak test, each leak test unit generating a failure output signal in response to a failed leak test on the industrial component,
 means for movably mounting each of said leak test units to said test area support surface between a operable position in which each said leak test unit is positioned in said test area to receive the industrial components from said robot, and an inoperable position in which the leak test unit is positioned outside of said test area,
 a robot control means for controlling the movement of the industrial components by said robot between said conveyor system and one or more selected leak test units in response to at least one control factor, said at least one control factor including said failure output signal,
 wherein said at least one control factor comprises the position of each leak test unit and means for transmitting the position of each leak test unit as an input signal to said robot control means.

11. The invention as defined in claim 10 and further comprising a control circuit associated with each leak test unit, each said control circuit generating a position signal indicative of the position of its associated leak test unit, said position signal being connected as input signal to said robot control means.

12. A system for leak testing industrial components comprising:
 a conveyor system for transporting the industrial components to and from a test area having a support surface,
 a robot operable in said test area, said robot having a manipulator which engages and moves the industrial components,
 at least two leak test units, each leak test unit having means for receiving the industrial component from said robot, means at said leak unit for thereafter subjecting said industrial component to a leak test, each leak test unit generating a failure output signal in response to a failed leak test on the industrial component,
 means for movably mounting each of said leak test units to said test area support surface between an operable position in which each said leak test unit is positioned in said test area to receive the industrial components from said robot, and an inoperable position in which the leak test is positioned outside of said test area,
 a robot control means for controlling the movement of the industrial components by said robot between said conveyor system and one or more selected leak test units in response to at least one control factor, said at least one control factor including said failure output signal,
 wherein said mounting means comprises an elongated track assembly associated with each leak test unit and mounted to said test area support surface, and a track follower mounted to leak test unit, each said track follower cooperating with its associated track assembly to enable movement of each said leak test unit along said track assembly.

13. The invention as defined in claim 12 herein said robot is mounted within said test area on said test area support surface and wherein an axis of each track assembly extends in radial direction with respect to said robot.

14. The invention as defined in claim 12 wherein each track assembly comprises a pair of spaced apart and parallel tracks and wherein each track follower comprises a plurality of wheels which engage said tracks.

15. A system for leak testing industrial components comprising:
 a conveyor system for transporting the industrial components to and from a test area having a support surface,
 a robot operable in said test area, said robot having a manipulator which engages and moves the industrial components, at least two leak test units, each leak test unit having means for receiving the industrial component from said robot, means at said leak unit for thereafter subjecting said industrial component to a leak test, each leak test unit generating a failure output signal in response to a failed leak test on the industrial component, means for movably mounting each of said leak test units to said test area support surface between an operable position in which each said leak test unit is positioned in said test area to receive the industrial components from said robot, and an inoperable position in which the leak test unit is positioned outside of said test area, a robot control means for controlling the movement of the industrial components by said robot between said conveyor system and one or more selected leak test units in response to at least one control factor, said at least one control factor including said failure output signal, means for selectively locking each of said leak test units in their respective operable positions.

16. A system for leak testing industrial components comprising:

a conveyor system for transporting the industrial components to and from a test area having a support surface, a robot operable in said test area, said robot having a manipulator which engages and moves the industrial components, at least two leak test units, each leak test unit having means for receiving the industrial component from said robot, means at said leak unit for thereafter subjecting said industrial component to a leak test, each leak test unit generating a failure output signal in response to a failed leak test on the industrial component, means for movably mounting each of said leak test units to said test area support surface between an operable position in which each said leak test unit is positioned in said test area to receive the industrial components from said robot, and an inoperable position in which the leak test unit is positioned outside of said test area, a robot control means for controlling the movement of the industrial components by said robot between said conveyor system and one or more selected leak test units in response to at least one control factor, said at least one control factor including said failure output signal, wherein each leak test unit is independently operable and independently powered with respect to the other leak test unit(s).

* * * * *

UNITED STATES PATENT AND TRADEMARK OFFICE
CERTIFICATE OF CORRECTION

PATENT NO.   : 6,578,407 B1
DATED         : June 17, 2003
INVENTOR(S)  : Michael Douglas McTaggart It is certified that error appears in the above-identified patent and that said Letters Patent is hereby corrected as shown below:

<u>Column 7,</u>
Line 33, replace "convey" with -- conveyor --.

<u>Column 8,</u>
Line 39, after "test" (1st Occurence), insert -- unit --.
Line 53, replace "herein" with -- wherein --.

Signed and Sealed this

Tenth Day of February, 2004

JON W. DUDAS
*Acting Director of the United States Patent and Trademark Office*